US011995792B2

(12) United States Patent
Foley, Jr. et al.

(10) Patent No.: US 11,995,792 B2
(45) Date of Patent: May 28, 2024

(54) SYSTEM AND METHOD FOR DETECTING AND RECTIFYING VISION FOR INDIVIDUALS WITH IMPRECISE FOCAL POINTS

(71) Applicants: Christopher Pratt Foley, Jr., Mountain View, CA (US); Carlie Madison Bolling, Orlando, FL (US); David Michael Guardiola, New York, NY (US); Gabriel Khalfani Smith, Philadelphia, PA (US); Katrina Kera Pham, Hermosa Beach, CA (US)

(72) Inventors: Christopher Pratt Foley, Jr., Mountain View, CA (US); Carlie Madison Bolling, Orlando, FL (US); David Michael Guardiola, New York, NY (US); Gabriel Khalfani Smith, Philadelphia, PA (US); Katrina Kera Pham, Hermosa Beach, CA (US)

( * ) Notice: Subject to any disclaimer, the term of this patent is extended or adjusted under 35 U.S.C. 154(b) by 293 days.

(21) Appl. No.: 17/482,597

(22) Filed: Sep. 23, 2021

(65) Prior Publication Data
US 2022/0101486 A1  Mar. 31, 2022

Related U.S. Application Data

(60) Provisional application No. 63/084,142, filed on Sep. 28, 2020.

(51) Int. Cl.
*G06T 3/18* (2024.01)
*A61H 5/00* (2006.01)
*G06T 7/00* (2017.01)

(52) U.S. Cl.
CPC .............. *G06T 3/18* (2024.01); *A61H 5/005* (2013.01); *G06T 7/00* (2013.01);
(Continued)

(58) Field of Classification Search
CPC ............. G06T 3/0093; G06T 7/00; G06T 2207/30041; G06T 3/00; A61H 5/005;
(Continued)

(56) References Cited

U.S. PATENT DOCUMENTS

| 2014/0085204 A1* | 3/2014 | Jahnke | G06F 3/013 345/158 |
| 2016/0227205 A1* | 8/2016 | Bathiche | H04N 13/324 |

FOREIGN PATENT DOCUMENTS

| WO | WO-2018066796 A1 * | 4/2018 | ............... A61H 5/00 |

OTHER PUBLICATIONS

Jiang, X. and Chen, Y.F., 2008. Facial image processing. Applied Pattern Recognition, pp. 29-48.*

* cited by examiner

*Primary Examiner* — Zhitong Chen

(57) ABSTRACT

Computer-implemented system and method that allows for the rehabilitation of individuals with strabismus by leveraging commercially available VR headset technology. Eye tracking capabilities and external cameras of existing VR headsets, enables the system and method to first gather the image that the dominant, unaffected eye is focused on (FIG. 1). Then, given where the strabismus unaffected eye's gaze falls on its screen, the system and method will take the image and identify where that point lies on the strabismus affected eye's screen. This point is the ideal gaze point of the strabismus affected eye. The software solution disclosed herein will then warp the strabismus affected eye's screen so that this new gaze will line up with the unaffected eye's gaze.

4 Claims, 10 Drawing Sheets

(52) U.S. Cl.
CPC ............... *A61H 2201/5007* (2013.01); *A61H 2201/5092* (2013.01); *G06T 2207/30041* (2013.01)

(58) Field of Classification Search
CPC .... A61H 2201/5007; A61H 2201/5092; A61H 2201/1604; A61H 2201/165; A61H 2201/5015; A61H 2201/5043
USPC .......................................................... 382/128
See application file for complete search history.

SYSTEM AND METHOD FOR DETECTING AND RECTIFYING VISION FOR INDIVIDUALS WITH IMPRECISE FOCAL POINTS

CROSS REFERENCE TO RELATED APPLICATION

This application claims the benefit of priority of U.S. Provisional Application No. 63/084,142, filed on Sep. 28, 2020. The entire contents of the foregoing application are incorporated herein by reference in their entirety.

TECHNICAL FIELD

The present invention provides a solution for rehabilitating individuals with strabismus. The technology relates to the adaptive rendering of virtual and augmented displays to improve focal discrepancies in individuals affected by conditions that result in erroneous gaze trajectories. The invention essentially provides a system for warping images to give binocular vision to individuals who currently do not have adequate binocular vision. This will allow them to better perform tasks including, but not limited to, playing games, engaging in vision therapy, or reading. The technology solution is broken into two parts: focal point identification and screen warping for moving the identified focal point.

BACKGROUND INFORMATION

In a virtual reality (VR)/augmented reality (AR) setup, both of the user's eyes are focused on different screens. An unaffected user could look around the screens and focus on any part of the screen at will. Strabismus affected users will have trouble focusing on the screen as their desired gaze does not line up with their actual gaze.

Strabismus can be conceptualized as the affected eye being rotated by some error angle away from the desired gaze. This difference between their actual gaze and their intended/desired gaze is what causes the difficulty in focusing. Due to this erroneous rotation of the eye, both of their eyes' gazes collectively intersect at a different point than intended. This new place in space is where the user ends up focusing. Oftentimes, this results in the user focusing on an unintended point, causing their vision to become blurred as they cannot make out their intended optical target.

For users wearing a VR/AR headset, this error angle causes the user's strabismus-affected eye to focus on the incorrect part of the screen while their unaffected eye is looking at the correct part of the screen. A perfect solution would rotate the eye back to the desired gaze. This would force the strabismus affected eye to look at the ideal part of the screen. Of course, this could only be done in a highly invasive way, such as surgery.

A non-invasive solution could rotate the screen around the eye by the error angle. Instead of moving the eye to meet the screen at the desired point, the screen could move to meet the eye. This could work as VR/AR headsets have one screen per eye. The unaffected strabismus eye could stare at an unchanging screen and the strabismus affected eye would stare at a screen that would rotate to meet the gaze at the ideal focal point. This would require significant mechanical augmentations to the VR/AR headset, but it could result in the correct image being received by both eyes.

Instead of taking this expensive, mechanically and electrically demanding approach requiring significant modifications to an existing VR/AR headset, the present invention provides a mathematically sound software method for analyzing and performing this correction on the image displayed to the screen. Rather than moving the screen, the screen can be distorted so that it appears as if it has been rotated. In lieu of a mechanical rotation, this software warps the image on the affected strabismic eye's VR/AR screen so that it is perceived as if it was rotated around the eye.

This warping operation could be achieved by performing the following operations: a 2-D to 3-D transformation of the image into a 2-D image plane held at a fixed distance from an orthographic camera, a rotation by the error angle of the image plane around the orthographic camera, and finally a rendering of what the orthographic camera captures.

SUMMARY OF INVENTION

The present invention can: (a) fully correct strabismus; (b) partially correct strabismus; (c) therapeutically strengthen eye muscles affected by strabismus; (d) be used as an assistive program or plug in for individuals afflicted by strabismus; and (e) be deployed on commercially available virtual reality and augmented reality headsets. For simple tasks in daily environments a single, dominant eye's gaze and knowledge of the image plane in front of both eyes can suffice in determining the user's desired gaze in the non-dominant eye. Simple tasks involve users focusing on opaque objects and not free space. Further therapeutic solutions could reduce the corrective factor.

The present invention does not require any prior knowledge of the camera locations or calibration settings. It also does not require any knowledge about the images being displayed to the VR/AR headset aside from the raw images and the gaze data of the user. The present invention utilizes a series of computer vision techniques in the field of robotics to fully and/or partially rectifying binocular vision for individuals afflicted by strabismus. The invention corrects or partially corrects strabismus by warping the affected eye's screen so that the affected eye's gaze lines up with the ideal gaze point. The invention determines the ideal gaze point of the affected eye by using a homographic transformation matrix to model the mapping between screens and mapping the unaffected eye's gaze point onto the affected eye's screen. It also identifies the ideal homographic transformation matrix by performing feature detection, RANSAC, and the eight-point algorithm.

This process will fully correct vision for strabismus affected individuals. In a therapeutic setting, a partial correction could be performed. This would establish the new gaze point in between the uncorrected gaze point and the desired gaze point. The degree of assistance would describe where the gaze would fall in between the ideal focal point and the original (uncorrected) focal point. The degree of assistance would slowly be reduced as therapy progresses to allow for the affected eye to adjust and gain strength overtime. Importantly, this process may prove more effective and less painful for strabismus patients than other therapies or invasive surgeries.

DETAILED DESCRIPTION

An orthographic camera is a type of camera which works by projecting the 3-D world onto a 2-D plane by absolute proximity. It does not take traditional single-point perspective into account. Rather 3-D space in front of the camera is collapsed onto the 2-D plane normal to the camera. This 2-D camera plane is then cropped and returned as the rendered image. Manipulating the image plane, which is rendered before the orthographic camera, see FIG. 1 description, is approximately equivalent to moving the physical screen.

Figure 1:
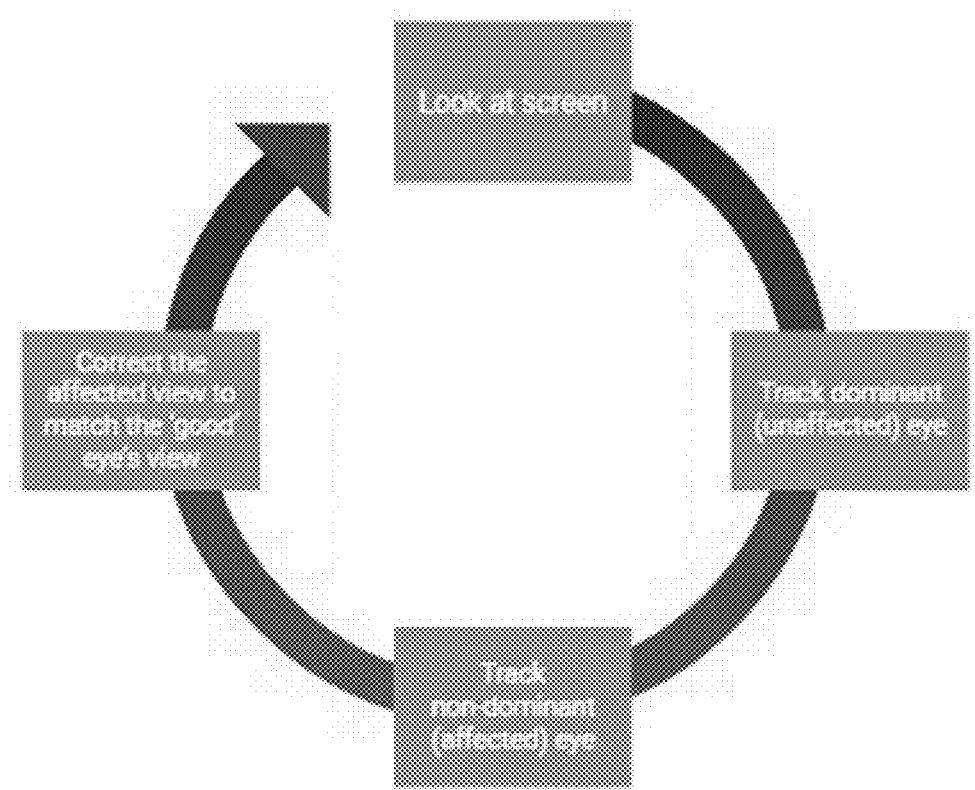
FIG. 1 details an overview of our system. The flow chart demonstrates how the invention cyclically corrects sight in live time. This system is not limited to augmented reality setups. It can be applied to any images being rendered to a screen on a virtual reality headset (VRHS). That image can be live from a physical camera or from a video game being played.

FIG. 1 details an overview of our system. The flow chart illustrates how the invention cyclically corrects sight in live time. This system is not limited to augmented reality setups. It can be applied to any images being rendered to a screen on a virtual reality headset (VRHS). The image can be live from a physical camera or from a video game being played.

Figure 2:
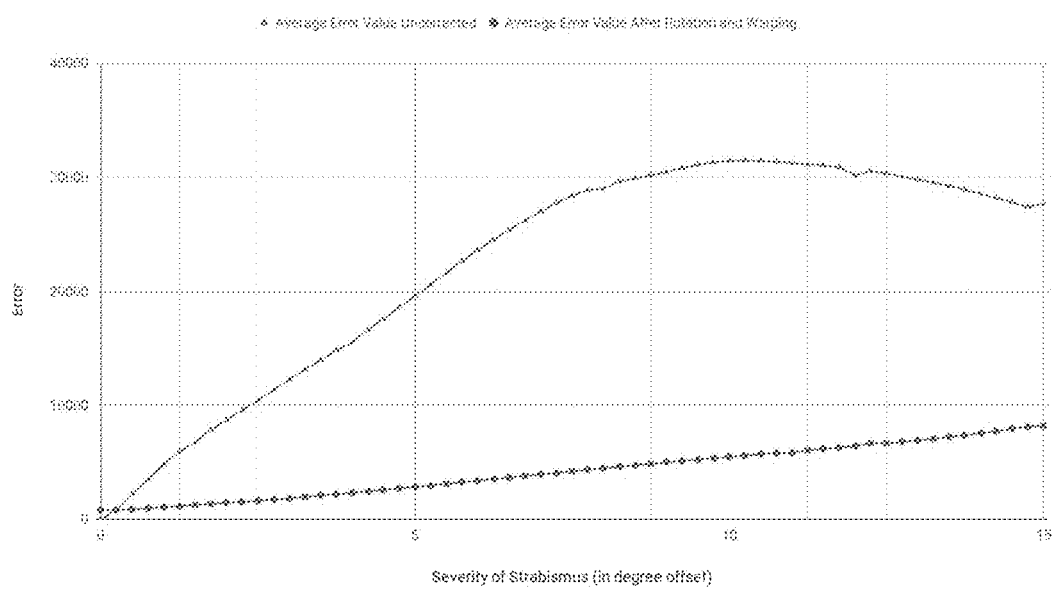
FIG. 2 is a graph generated from simulation tests in Unity of our system. The graph enumerates the error between the image perceived by the user and the desired image for a sweep of image angle. Two cases are shown: when the image is uncorrected and when the image is corrected using our detailed image warping process given that the ideal gaze point is known. For the purposes of the graph, error is measured as the L2 norm between the ideal perceived image and the actual perceived image. The L2 norm was chosen as the error metric as it places a heavier weight on large differences between pixels than the L1 norm. Consequently, issues that may have arisen due to aliasing of pixels are weighted less in this error metric.

This process entails a rotation and projection operation prior to screen rendering. This aspect of the solution simply requires a software change to the rendering technology. In FIG. 2, it is shown that this process is a significant improvement over the baseline of no correction since the ideal focal point is already known. Error in FIG. 2 is measured as the L2 norm between an image taken normally and an image taken at an error angle and then warped back into place with post processing.

FIG. 2 is a graph generated from simulation tests in Unity of our system. The graph enumerates the error between the image perceived by the user and the desired image for a sweep of image angle. Two cases are shown: when the image is uncorrected and when the image is corrected using our detailed image warping process given that the ideal gaze point is known. For the purposes of the graph, error is measured as the L2 norm between the ideal perceived image and the actual perceived image. The L2 norm was chosen as the error metric as it places a heavier weight on large differences between pixels than the L1 norm. Consequently, issues that may have arisen due to aliasing of pixels are weighted less in this error metric.

In order to make integration of this technology as seamless as possible, the software solution must be able to detect the desired gaze using only information available to contemporary VR/AR headset rendering pipelines. This would allow for the software to work independent of which application the VR/AR device is executing. The software solution of the present invention determines the desired gaze using only screen data and the VR/AR eye focal tracking data.

Figure 3:
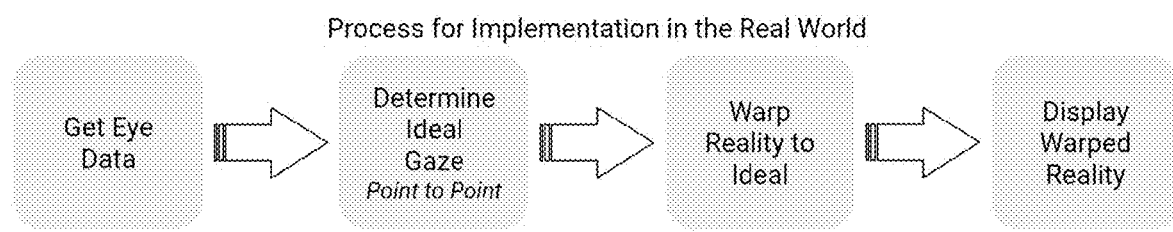
FIG. 3 is a high-level flowchart detailing how gaze information is used in the program.

The process for implementation and the pipeline for acquiring/displaying data is illustrated in FIG. 3, which is a high-level flowchart detailing how gaze information is used in the program. This process is referred to as point-to-point conversion. The aim is to determine where the affected eye should be looking given both of our screens and the unaffected eye's gaze information. The first step is to find which pixel is the unaffected eye's focal point. The next step is to take the unaffected eye screen and crop it closely around that focal point in order to throw away excessive data that might cause undo latency. The following step is to run a feature detection algorithm across both the cropped unaffected eye screen and the affected eye's screen. While any feature detection algorithm can be used, for the purposes of simulation, the "FAST" algorithm has been used. This algorithm works by convolving a corner detection filter across each image and returning local maximas.[1] In summation, this algorithm looks at small sections of both pictures and attempts to determine where the corners are located and how they are oriented. Any feature detection algorithm could work as long as more than eight features can be consistently generated on the screen data.

[1] Rosten, Edward; Tom Drummond (2005). Fusing points and lines for high performance tracking (PDF). IEEE International Conference on Computer Vision. 2. pp. 1508-1511.

Then, through a process called RANSAC, the present invention randomly picks and evaluates the correctness of feature pairings between each screen. This is done by analyzing the similarities between previously detected features on each screen. First, a feature is chosen at random on one screen and another feature is chosen at random on the other. Then, the local cropped images around each feature are compared. From there the feature pairing is given a rating.[2]

[2] Martin A. Fischler & Robert C. Bolles (June 1981). "Random Sample Consensus: A Paradigm for Model Fitting with Applications to Image Analysis and Automated Cartography" (PDF). Comm ACM. 24 (6): 381-395.

Once at least eight pairings that meet a rating threshold are established, a general mapping between parts of one image and the other can be formed. A homography matrix is formed representing the mapping between the cropped unaffected eye's screen and the affected eye's screen. This matrix is formed via the eight-point algorithm developed by Christopher Longuet-Higgins[3].

[3] Longuet-Higgins, H. A computer algorithm for reconstructing a scene from two projections. Nature 293, 133-135 (1981). https://doi.org/10.1038/293133a0.

Using this matrix the focal point in the affected eye's screen is identified by mapping its location in the unaffected eye's screen to the affected eye's screen. The steps have been shown below.

Figure 4A:
FIG. 4A is a list of the process steps in point-to-point conversion between the affected eye's screen and the unaffected eye's screen.

FIG. 4A is a list of the process steps in point-to-point conversion between the affected eye's screen and the unaffected eye's screen.

Figure 4B:
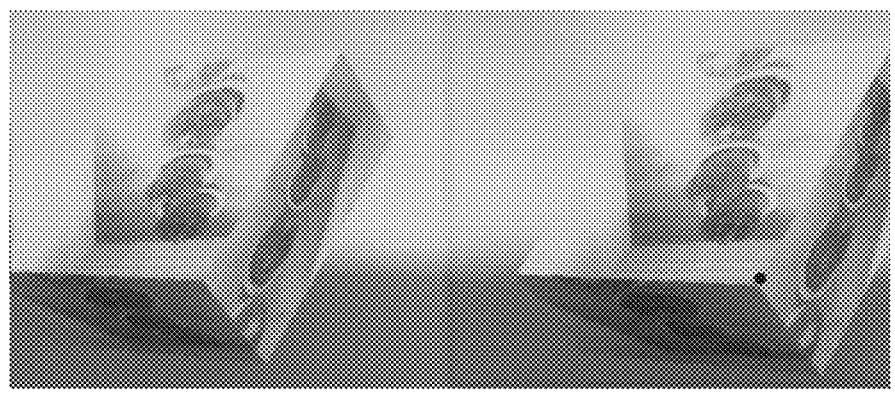
FIG. 4B is a description and image of the first step of point-to-point conversion. The screen image on the left represents the strabismus affected eye's screen. The screen on the right represents the strabismus unaffected eye's screen. The blue dot is the ideal gaze point.

FIG. 4B is a description and image of the first step of point-to-point conversion. The screen image on the left represents the strabismus affected eye's screen. The screen on the right represents the strabismus unaffected eye's screen. The blue dot is the ideal gaze point. As shown in FIG. 4B, take in two input images, one from the non-dominant eye (left image) and one from the dominant eye (right image), and a dominant eye focal point.

Figure 4C:
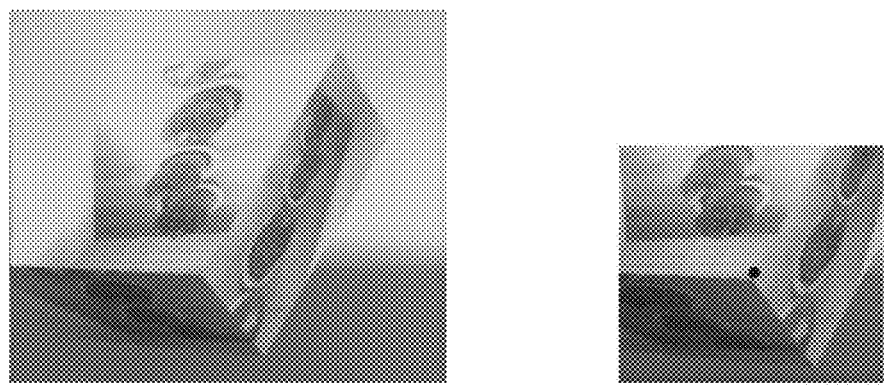
FIG. 4C is a description and image of the second step of point-to-point conversion. The screen image on the left represents the strabismus affected eye's screen. The screen on the right represents the cropped strabismus unaffected eye's screen. The blue dot is the ideal gaze point. The process of cropping reduces the data necessary to make a match. It improves efficiency of the algorithm.

FIG. 4C is a description and image of the second step of point-to-point conversion. The screen image on the left represents the strabismus affected eye's screen. The screen on the right represents the cropped strabismus unaffected eye's screen. The blue dot is the ideal gaze point. The process of cropping reduces the data necessary to make a match. It improves efficiency of the algorithm. As shown in FIG. 4C, disregard excessive data by cropping the dominant image local to the focal point.

Figure 4D:
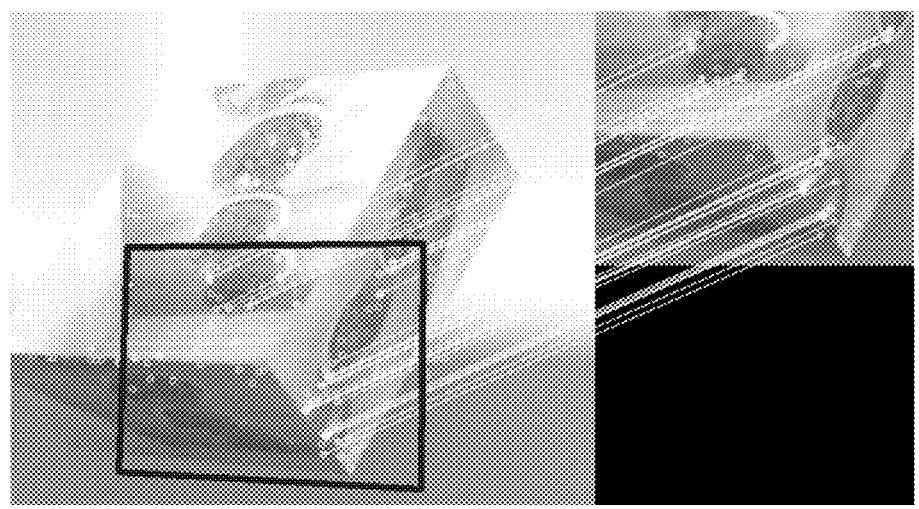
FIG. 4D is a description and image of the third step of point-to-point conversion. The screen image on the left represents the strabismus affected eye's screen after feature detection, RANSAC, and the eight-point algorithm have been performed. The blue box represents the projection of the cropped unaffected eye's screen onto the strabismus affected eye's screen given the homography matrix calculated by the eight-point algorithm. The screen on the right represents the cropped strabismus unaffected eye's screen after feature detection. The white dots represent the individual features identified by the feature detection algorithm. The white lines represent feature pairing that met the threshold of a valid feature pairing during the RANSAC evaluation step.

FIG. 4D is a description and image of the third step of point-to-point conversion. The screen image on the left represents the strabismus affected eye's screen after feature detection, RANSAC, and the eight-point algorithm have been performed. The blue box represents the projection of the cropped unaffected eye's screen onto the strabismus affected eye's screen given the homography matrix calculated by the eight-point algorithm. The screen on the right represents the cropped strabismus unaffected eye's screen after feature detection. The white dots represent the individual features identified by the feature detection algorithm. The white lines represent feature pairing that met the threshold of a valid feature pairing during the RANSAC evaluation step. As shown in FIG. 4D, scan features of both images using emgu.cv to establish a highest probability homography matrix that maps the points between two images.

Figure 4E:
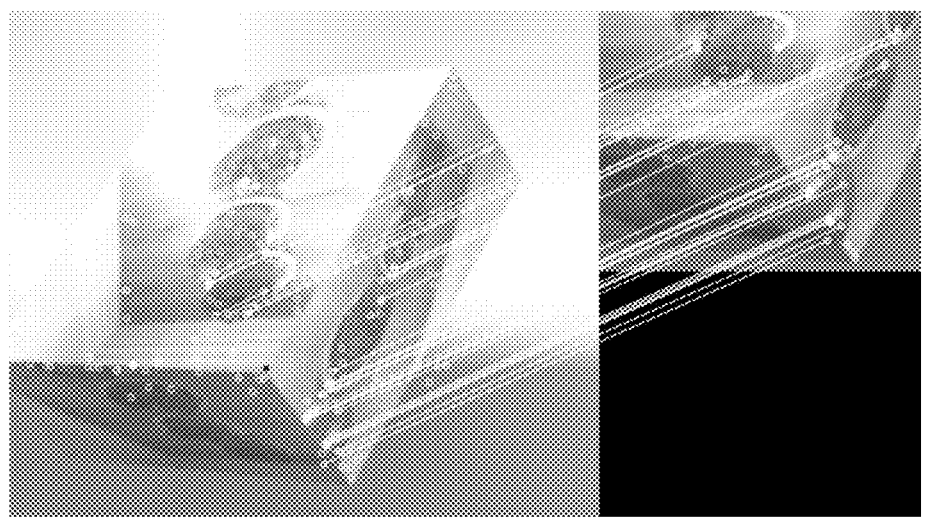
FIG. 4E is a description and image of the third step of point-to-point conversion. The screen image on the left represents the strabismus affected eye's screen after feature detection, RANSAC, and the eight-point algorithm have been performed. The screen on the right represents the cropped strabismus unaffected eye's screen after feature detection. The white dots represent the individual features identified by the feature detection algorithm. The white lines represent feature pairing that met the threshold of a valid feature pairing during the RANSAC evaluation step. The blue dot on the left screen represents where the ideal gaze point in the unaffected eye lies in the affected eye's screen.

FIG. 4E illustrates where the center of the cropped dominant eye's image (the focal point of the original dominant eye's image) lies in the non-dominant eye's image. This process uses the homography matrix developed in the previous step.

As shown in FIGS. 4A-E, while the calculations are being performed, screen updates can still be rendered using older results. In between point-to-point conversion computations, fast screen updates can be performed by caching the previous homography matrix. Using the cached matrix, intermediate gaze points can be calculated. This is effective in the short period of time that it takes to compute a new homography matrix. The matrix only necessitates drastic recomputation when the images change significantly.

Figure 5:
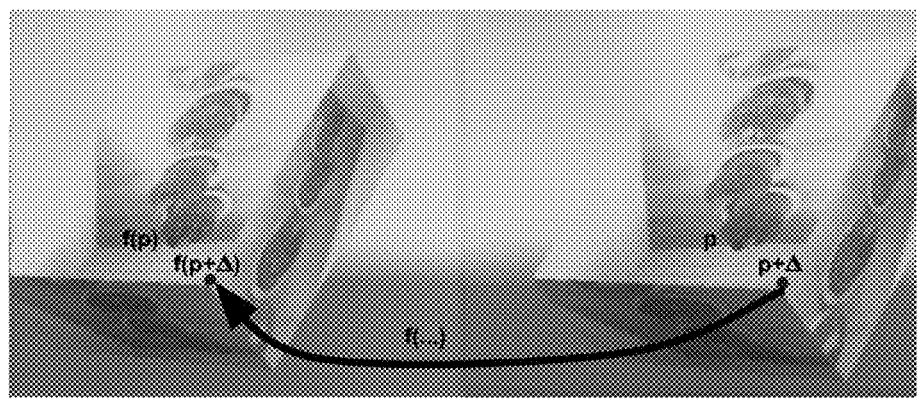
FIG. 5 is a chart detailing how the same homographic transformation matrix can be reused briefly as the focal point moves.

FIG. 5, which illustrates point to point comparisons, is a chart detailing how the same homographic transformation matrix can be reused briefly as the focal point moves.

After establishing a focal point in the strabismus affected eye's screen, the warping process previously mentioned can be performed. The benefit of using point to point conversion to evaluate the desired gaze point is that it does not require any intrinsic knowledge about at what the user is looking at. The display could be showing a live camera feed, a video, a static image, or a 3D video game. The software works regardless of the visual image and can be integrated into the firmware of the device or as a part of a VR/AR application.

Figure 6:
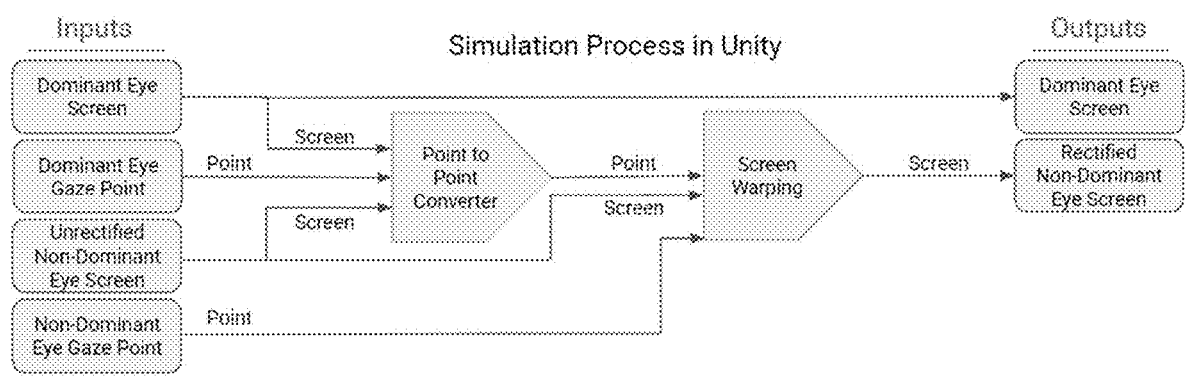
FIG. 6 is a low-level system flow chart that shows how the modules that make up our software interact. While it is a mockup of the simulation process in Unity, implementations of this software for consumers would have a similar structure.

As shown in FIG. 6, simulation process FIG. 6 is a low-level system flow chart that shows how the modules that make up our software interact. While it is a mockup of the simulation process in Unity, implementations of this software for consumers would have a similar structure.

The effectiveness of software solution will be tested by having a user count how many times a dot appears on a screen when the user's focus is on one spot. The user will undergo the pilot study for 10 minutes, once with the commercial VR headset on, once with accompanying provided therapeutic software implementation, and once without the software implementation. (20 minutes total for the study itself and a 10-minute rest period). A comparison of the two pilot tests will help determine effectiveness; if the therapeutic software is beneficial, then higher accuracy would be expected for the pilot test with the commercially available VR headset coupled with our software invention. The use of existing eye tests will maximize quality of data obtained from having subjects use provided therapeutic software and commercially available VR headset. Another outcome variable is the users' comfort while using the commercially available VR headset (user feedback). The tests will proceed as follows: run a single blind pilot study with a randomized order. There will be two groups of participants: one affected by strabismus and another not affected by strabismus. Participants will be asked to perform the test twice with a commercially available VR headset on. One run through the test will have a slightly corrected image (no placebo). Another run through the test will not have a corrected image (placebo). The order of variations of the pilot test will be randomized. Most adults affected by strabismus will see two versions of the dots present. As a result, our method is expected to at most halve the number of dots seen by participants. In the present invention, a 95% confidence interval with 20 participants (roughly 10 of which have strabismus and 10 do not) was used, with a confidence interval given by equation 1. Equation 1 is a statistical equation showing the expected confidence interval of testing given our small sample size and desire for a 95% confidence interval.

$$\mu_{mean} \pm \frac{2.228 \cdot \sigma_{standard\ deviation}}{\sqrt{10}} \qquad \text{Equation 1}$$

If it can be proven that the confidence intervals overlap for individuals unaffected by strabismus and do overlap for those affected by strabismus, then the intervention had a statistically significant effect solely on people with strabismus. Increasing the number of participants could decrease the 95% t-table value to 1.95 at the best, which is not significant enough to justify drastically increasing the number of participants. The data will be separated into two datasets: affected individuals with correction and unaffected individuals with correction. The standard deviation and average for each set will be established. From there, the 95% confidence interval for each dataset will be determined using a T-test and if the correction results in a similar confidence interval. In addition, a similar analysis will be performed on those affected with correction and those affected without correction. The goal is to then see if these datasets 95% confidence intervals do not intersect.

Individuals affected by conditions like strabismus have a difficulty visually focusing on specific points in space. Their eyes' gazes might intersect at regions far away from the object they are trying to look at. This may lead to an affected individual not being able to perform several tasks that require concentrating on a single point in space. This can make it difficult for affected individuals to perform any tasks that require reading or hand-eye coordination.

The algorithm of the present invention could be used many ways in a variety of VR/AR headsets. It could be applied as a software patch to individual VR/AR software applications. This would allow video game developers to add strabismus accessibility features to games directly. It could be added by the game engines to add accessibility features by default to games built in their proprietary engine. It could also be added as a firmware update by VR/AR device manufacturers, so all applications could have built-in strabismus accessibility features.

Strabismus affects roughly 4% of the population. For strabismus, available treatment options include eye patch therapy, in which the dominant unaffected eye is covered so that the patient must rely on their strabismus affected eye alone. This method has variable success but can also be painful and irritating. Ocular muscle therapy is another option for strabismus patients. Surgery is performed on the affected eye and the patient must also do follow-up therapies, which is about 60% effective but can be quite expensive. Finally, binocular fusion exercises put lenses in front of the eyes to alter the incoming light, but this approach does not correct the root of the problem.

Building upon the idea of binocular fusion exercises the present invention provides a therapeutic software solution utilizing current gen virtual reality hardware to help restore binocular vision. VER will grant the user clear and non-doubled vision essentially giving them the depth perception needed to interact with their environment as someone without strabismus could. Our design can perform a full correction. This is effective as it will allow users to instantly lose the double vision caused by their strabismus. However, from talks with ophthalmologists and physicians at the Children's Hospital of Philadelphia, a therapeutic approach is also desirable as it would allow a doctor to adjust the degree of correction overtime to strengthen the eye muscle. As a result, our design plans for a de facto full correction with support for decreasing the percentage of epsilon mitigation.

What is claimed is:

1. A computer-implemented method for treating and correcting strabismus in an afflicted individual's eye, the method comprising:
   obtaining at least one image on each of the eyes of an individual using a VR headset, wherein one eye is dominant and one eye is non-dominant;
   electronically storing data from the two images on the dominant eye and on the non-dominant eye;
   highlighting the focal point of the dominant eye's image;
   using a homography matrix that maps points between the two images;
   establishing where the focal point of the dominant eye's image lies in the non-dominant eye's image using the homography matrix to evaluate a desired gaze point; and
   warping the image of the eye affected with strabismus to create a correction image so that the gaze point of the affected eye lines up with the desired gaze point, thereby controlling the image seen by the affected eye.

2. The computer-implemented method as defined in claim 1, wherein the homography matrix applies point-to-point conversion computation.

3. The computer-implemented method as defined in claim 1, wherein the homography matrix is applied and recalculated as the focal point moves.

4. The computer-implemented method as defined in claim 1, wherein highlighting the focal point of the dominant eye's image includes-eliminating excessive data by cropping said image.

* * * * *